United States Patent [19]

McDermott et al.

[11] Patent Number: 5,674,966
[45] Date of Patent: Oct. 7, 1997

[54] LOW MOLECULAR WEIGHT LIQUID INJECTION MOLDING RESINS HAVING A HIGH VINYL CONTENT

[75] Inventors: Philip J. McDermott, Albany; Donald S. Johnson, Scota; Brian J. Ward, Valley Falls; Edward Matthew Jeram, Burnt Hills, all of N.Y.

[73] Assignee: General Electric Company, Pittsfield, Mass.

[21] Appl. No.: 631,302

[22] Filed: Apr. 9, 1996

Related U.S. Application Data

[63] Continuation-in-part of Ser. No. 461,461, Jun. 5, 1995, abandoned.

[51] Int. Cl.$^6$ .................................................. C08G 77/20
[52] U.S. Cl. ........................... 528/32; 528/15; 528/39; 525/477
[58] Field of Search ................... 528/15, 32, 39; 525/477

[56] References Cited

U.S. PATENT DOCUMENTS

| | | |
|---|---|---|
| 2,938,009 | 5/1960 | Lucas . |
| 3,024,126 | 3/1962 | Brown . |
| 3,159,601 | 12/1964 | Ashby . |
| 3,159,662 | 12/1964 | Ashby . |
| 3,220,972 | 11/1965 | Lamoreaux . |
| 3,344,111 | 9/1967 | Chalk . |
| 3,436,366 | 4/1969 | Modic . |
| 3,445,420 | 5/1969 | Kookootsedes et al. . |
| 3,635,743 | 1/1972 | Smith . |
| 3,715,334 | 2/1973 | Karstedt . |
| 3,775,452 | 11/1973 | Karstedt . |
| 3,814,730 | 6/1974 | Karstedt . |
| 3,847,848 | 11/1974 | Beers . |
| 3,884,866 | 5/1975 | Jeram et al. . |
| 3,957,713 | 5/1976 | Jeram et al. . |
| 4,041,010 | 8/1977 | Jeram . |
| 4,123,604 | 10/1978 | Sandford, Jr. ............ 528/15 |
| 4,162,243 | 7/1979 | Lee et al. . |
| 4,256,870 | 3/1981 | Eckberg . |
| 4,427,801 | 1/1984 | Sweet . |
| 4,529,752 | 7/1985 | Bluestein . |
| 4,599,374 | 7/1986 | Bluestein . |
| 4,855,381 | 8/1989 | Mutoh et al. . |
| 5,235,004 | 8/1993 | Kobayashi et al. . |

FOREIGN PATENT DOCUMENTS

| | | |
|---|---|---|
| 69926 | 3/1983 | European Pat. Off. . |
| 322196 | 6/1989 | European Pat. Off. . |
| 0516108 A | 12/1992 | European Pat. Off. . |
| 0652258A | 5/1995 | European Pat. Off. . |
| 0661330 A | 7/1995 | European Pat. Off. . |
| 0718344 A | 6/1996 | European Pat. Off. . |
| 63-241033 A | 10/1988 | Japan . |
| 1089809 | 11/1967 | United Kingdom . |

OTHER PUBLICATIONS

Chemical Abstracts 119:160037 and J Org. Chem. (1993) 58(17) 4646–55 see Abstract.

Chemical Abstracts 117:8707 and JP 03232840 A2 (Asahi Chemical Industry Co) see abstract.

Chemical Abstract 109:150229 and JP 63096144 A2 (Agency of Industrial Sciences and Technology) see abstract.

Chemical Abstracts 108:221321 and Azerb Khim Zh (1986), (5), 40–4 see Abstract.

Chemical Abstracts 97:24703 and FR 2487842 A (Institute of Heterocyclic Compounds) see Abstract.

Chemical Abstracts 91:38881 and Azerb Khim Zh (1978) (5) 42–3 see Abstract.

Abstract of Inorg. Chem., 35(1), 261–2, (1996) S.E. Yuchs & K.A. Carrado, "A one-step method for the synthesis of a vinyl–containng silsesquioxane and other organolithic macromolecular precursors".

Synth. React. Met.–Org. Chem., 24(7), 1099–110, (1994) I. Hasegawa et al, "Synthesis of silylated derivatives of the cubic octomeric silicate species Si8O20 8–".

Macromol. Chem. Phys., 195(6), 1973–83, (1994) T. Ogawa et al, "Synthesis of star–shaped polydimethylsiloxanes containing SiO2 core units".

Inorg. Chem., 29(9), 1603, (1990) P.A. Agaskar, "Facile high yield synthesis of functionalized spherosilicates: precursors of novel organolithic nacromolecular meterials".

*Primary Examiner*—Melvyn I. Marquis
*Attorney, Agent, or Firm*—Kenneth S. Wheelock

[57] ABSTRACT

Low molecular weight, high alkenyl content silicone resins of the general formula $M_y M^{vi}_x D_a D^{vi}_b T_c T^{vi}_d Q$ or $M_y M^{vi}_x D_a D^{vi}_b T_c T^{vi}_d$ are disclosed, their use in curable liquid injection molding compositions, a process for varying the cure properties of such compositions and articles of manufacture made thereby and therewith.

53 Claims, No Drawings

LOW MOLECULAR WEIGHT LIQUID INJECTION MOLDING RESINS HAVING A HIGH VINYL CONTENT

CROSS REFERENCE TO RELATED APPLICATIONS

This application is a Continuation-In-Part application of U.S. Ser. No. 08/461,461 filed Jun. 5, 1995, now abandoned.

FIELD OF THE INVENTION

The present invention relates to silicone compositions useful as liquid injection molding resins particularly to low molecular weight silicone MQ resins having a high alkenyl content as a component thereof.

BACKGROUND OF THE INVENTION

Liquid injection moldable organopolysiloxane compositions are known and used. A problem with all such compositions is that the hardness, tensile strength, elongation and tear are so interdependent among themselves and also with the viscosity of the uncured liquid precursor that it is difficult to improve one property without deleterious effects on the other properties. Additionally, the kinetics and thermochemistry of the liquid injection molding process and the compositions used therewith have been such that only small lightweight articles of manufacture could be made by the techniques of liquid injection molding because of the speed with which the liquid precursor cures once it has been injected into the mold.

Liquid injection molding organopolysiloxane compositions are typically provided as two components that are mixed immediately prior to use. Both components contain alkenyl polymers, fillers, and in some cases resins. The first component contains a platinum catalyst while the second component contains a hydride cross linker and cure inhibitors. The two components are mixed immediately prior to use in the injection molding apparatus. In addition to providing a so-called formulation pot-life, the inhibitor must prevent curing of the curable composition until the mold is completely filled. Once the mold is completely filled the inhibitor must then allow for a rapid cure of the curable or polymerizable composition in order to ensure a short cycle life.

U.S. Pat. Nos. 3,884,866 and 3,957,713 describe high strength addition cured compositions suitable for low pressure liquid injection molding. These compositions comprise a first component containing a high viscosity vinyl end-stopped organopolysiloxane, a low viscosity vinyl containing organopolysiloxane, filler, and platinum catalyst which is cured by mixing with a second component containing a hydrogen silicone composition. This composition has a low durometer, ca 20–35 Shore A, and, moreover it is difficult to increase the durometer or hardness without adversely affecting other properties.

U.S. Pat. No. 4,162,243 discloses compositions similar to the previously referenced compositions but they contain as the most important distinction, fumed silica that has been treated with hexamethyldisilazane and tetramethyldivinyldisilazane. The compositions of the '243 patent cure to elastomers having high hardness with good retention of other properties including strength, elongation, and tear in addition to having a low viscosity in the uncured state.

U.S. Pat. No. 4,427,801 extends the teaching of the '243 patent by incorporating a MM$^{vi}$Q resin in addition to the vinyl containing treated fumed silica. This produces elastomers having even a higher hardness and tear strength but has the disadvantage of higher compression set and lower Bashore resilience.

The manufacturing technique of liquid injection molding typically has been limited to small parts, usually materials weighing less than from about 5 to about 50 grams. Advances in technology are allowing liquid injection molded parts to become larger. Larger parts require larger molds. Larger molds require more time to fill the mold with resin and thus curing must be inhibited for longer times in order to allow the mold to fill before cure may be initiated.

Silicone liquid injection molding (LIM) materials are pumpable blends of silicone oligomers and polymers typically possess a viscosity ranging from 200,000 to 3,500,000 centipoise (cps). As presently utilized, these materials consist of two components that are mixed in a 1:1 ratio which when catalyzed will cure (or cross-link) to a rubber or elastomer upon heating. The first or "A" component typically contains siloxane polymers, fillers, various additives, and catalyst. The second or "B" component typically also contains siloxane polymers, additives, and fillers but also contains hydrogen siloxanes and cure inhibitors. The physical properties of both the cured and uncured materials depends in a very large degree upon the compositions utilized to generate the "A" and "B" components.

Typical LIM compositions consisting of the "A" and "B" components together generally are made up of the following ingredients:

1) from 50 to 75 parts by weight of a vinyl stopped polydimethylsiloxane having a viscosity ranging anywhere from 10,000 to 100,000 centipoise and a vinyl content of ranging from approximately 0.05 to 0.15 weight percent;

2) up to 10 parts by weight of a low molecular weight vinyl stopped vinyl on chain polyorganosiloxane having a viscosity ranging from 200 to 1500 centipoise and a vinyl content of approximately 1.5 weight percent;

3) up to 10 parts by weight of a low molecular weight mono-vinyl stopped polyorganosiloxane having a viscosity ranging anywhere from 500 to 2,000 centipoise;

4) from 20 to 30 parts by weight of a fumed or pyrogenic silica having a surface area ranging from 150 to 450 m$^2$/gm;

5) from 2 to 20 wppm of Pt hydrosilylation catalyst;

6) from 0.01 to 0.50 parts by weight of an inhibitor compound; and 7) from 100 to 500 wppm of silyl hydrides. Additional components may include extending fillers, coloring agents, additives to impart increased performance with respect to certain physical properties such as off resistance, heat aging, ultra-violet stability and the like.

One particularly desirable attribute of a cured LIM material is a cured rubber having a high durometer. Because these materials must be pumpable, one typical solution to this problem is to add a large amount of a filler anywhere from 25 to 70% by weight of the final cured rubber or elastomer. Use of large quantities of filler in a moderately viscous fluid such as the polymers used to prepare the precursor mixtures results in a fluid having high levels of suspended solids that significantly increase the viscosity of the mixture. Fumed silica is routinely used as a reinforcing filler to achieve high durometer in the cured rubber, however, at weight percent levels above 25 weight percent fumed silica, the LIM compositions become un-pumpable, defeating the purpose of liquid injection molding. Consequently, extending fillers are added and these usually impart color to the finished product. While this is not an undesirable result for many applications, it is occasionally a drawback.

Another approach to achieving a high durometer is to increase the cross link density of the cured rubber. It should be noted that because of the presence of vinyl groups, peroxide cures are not necessarily prohibited. Such formulations require the separate presence of olefinic unsaturation and hydrido terminated siloxane species and are catalyzed by noble metal catalysts. While this results in a high cross link density for the cured rubber, the drawbacks associated with these formulations is that although the desired high durometer is achieved the resulting cured rubbers suffer from very high moduli and very low elongations.

The traditional approach has been to use large amounts of so-called functionalized resins. Current technology calls for the use of $MM^{vi}Q$ (where M is present in a greater quantity than $M^{vi}$ in the $MM^{vi}Q$ resin) and $MD^{vi}Q$ resins in order to obtain optically clear materials that are flowable and when cured have durometers greater than 55. In order to achieve a durometer greater than 55, many LIM formulations require in excess of 18 weight percent of these resins which typically range from about 0.10 to about 5.00 weight percent alkenyl, usually vinyl. The large amounts of resin needed in order to achieve the required high cross link density result in material with high compression set, very low bayshore resilience, and poor heat age stability. Additionally, the presence of large amounts of alkenyl resins in the formulations adds significantly to the cost of the resulting cured rubber.

SUMMARY OF THE INVENTION

There is provided in the instant invention a high alkenyl content silicone resin selected from the group of resins having the formula:

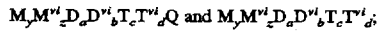

where $Q=SiO_{4/2}$; $M=(R^2)_3SiO_{1/2}$; $M^{vi}=R^1(R^2)_2Si$; $D=R^2_2SiO_{2/2}$; $D^{vi}=R^1R^2SiO_{2/2}$; $T=R^1SO_{3/2}$; and $T^{vi}=R^2SiO_{3/2}$; where each $R^1$ is independently selected and is a two to twelve carbon atom alkenyl group and where each $R^2$ is independently selected and is a one to eight carbon atom alkyl, aryl, or alkylaryl group and where the subscripts a, b, c, d, and y may be zero or a positive number and where the subscripts y and z satisfy the following relationship: $1 \leq (y+z) \leq 4$ subject to the limitation that z and y satisfy one of the two relationships: $(z/y) > 1$ or $z > y$, when Q is present and when Q is absent the subscripts c or d must be positive and non-zero.

There is further provided in the present invention curable silicone liquid injection molding compositions comprising a resin selected from the group of resins having the formula: $M_yM^{vi}_zD_aD^{vi}_bT_cT^{vi}_dQ$ and $M_yM^{vi}_zD_aD^{vi}_bT_cT^{vi}_d$.

There is additionally provided by the present invention cured articles of manufacture made from curable silicone liquid injection molding resins comprising a resin selected from the group of resins having the formula: $M_yM^{vi}_zD_aD^{vi}_bT_cT^{vi}_dQ$ and $M_yM^{vi}_zD_aD^{vi}_bT_cT^{vi}_d$.

The cured properties of the articles of manufacture of the present invention may be varied by controlling the amount of the resin of the present invention used in the curable compositions and curing same.

An optimum ratio exists between the amount of the hydride fluids and/or resins of these compositions and the alkenyl content of the present invention used in these various curable compositions to develop cross-link density, that ratio being about 1 to 1.6 respectively, with an optimum ratio being about 1.3.

DETAILED DESCRIPTION OF THE INVENTION

We have discovered that by using alkenyl or vinyl containing resins that are both low molecular weight and high in olefinic unsaturation that liquid injection molding curable compositions may be obtained that result in cured rubbers having a faster cure rate, high durometer, high resiliency, better compression set, and improved heat age stability. Such low molecular weight high alkenyl content resins have a molecular weight below about 2,000 g/mole, preferably ranging from about 400 g/mole to about 2,000 g/mole and more preferably ranging from about 600 g/mole to about 1,500 g/mole, and most preferably ranging from about 800 g/mole to about 1,200 g/mole. These low molecular weight resins possess alkenyl contents greater than 3 weight percent, preferably from about 10 weight percent to about 30 weight percent, more preferably from about 15 weight percent to about 25 weight percent, and most preferably from about 18 weight percent to about 23 weight percent. As a consequence of these constraints, the resins of the present invention possess viscosities ranging from about 100 to about 15,000 centipoise, more preferably from about 500 to about 10,000 centipoise, and most preferably from about 1,000 to about 5,000 centipoise.

These resins may be pure compounds or mixtures of compounds which are generically described by the following formula:

where x is a number in the range $0.62 \leq x \leq 4$. The resins are made by the following synthetic procedure varying only the ratios of the starting materials:

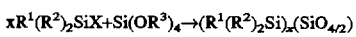

where X is a halogen selected from the group consisting of chlorine, bromine, and iodine, preferably chlorine, and where $R^1$ is a two to twelve atom alkenyl group, $R^2$ is a one to eight atom alkyl, aryl, or alkylaryl group, and $R^3$ is a one to twelve atom alkyl, aryl or alkylaryl group. While the most convenient synthesis of these resins utilizes the first members of the series defined above, e.g. $M^{vi}$ being vinyl dimethyl silyl, the most convenient and most readily commercially available ester is tetraethyl-orthosilicate. It should be noted that the resins of the present invention may be synthesized by a reaction between the halo-silane above and sodium silicate. The molar ratio of $M^{vi}$ to Q, x, and the choice of substituents for the substitutions in the $M^{vi}$ moiety are the governing considerations in producing a low molecular weight high alkenyl content resin of the general formula. Since most silicone synthetic procedures are highly equilibrium dependent, and as previously mentioned for this particular synthetic procedure, dependent on the molar ratio of starting materials, it should be readily recognized that even though the ratios of starting materials are selected on the preferred integral basis defined by the stoichiometry, the resulting resinous product will actually be a mixture of oligomers that will on analysis show on average the integral value of the molar ratio of the starting materials. Thus while the ratios of starting materials is narrowly confined to between 1 or 2 and 4, and while the product will analyze for the particular ratio used in synthesis, the actual resin will most likely contain a range of molecular stoichiometries that present a molar average that is representative of the ratio of the starting materials, as defined above.

The reaction is usually carried out in the following temperature range: from about 25° to about 200° C., more preferably from about 90° to about 170° C., and most preferably from about 130° to about 145° C.

Compounds having the formula:

where $M=(R^2)_3SiO_{1/2}$
with $R^2$ as previously defined and each $R^2$ may be independently selected from the group consisting of one to eight atom alkyl, aryl, or alkylaryl hydrocarbon radicals; and

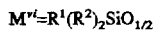

with $R^1$ as previously defined and $R^2$ as previously defined; with the subscripts y and z subject to the following limitations: $1 \leq (y+z) \leq 4$ where $z>y$ such that $(z/y)>1$ and the sum z+y is generally an integer between one and four. When y is zero, the following elementary algebraic manipulations provide for interpretation of the requirement that $(y/z)>1$:

1) the equation is multiplied by y, $y \times ((z/y)>1)$
2) yielding the following expression, $y(z/y)>1y$
3) which simplifies upon cancellation of common terms to $z>y$; thus $(z/y)>1$ when y is non-zero and $z>y$ when y is zero.

By using a mixture of halo-silane compounds of the two general formulas: 1) $(R^2)_3SiX$ and 2) $R^1(R^2)_2SiX$ is present in a ratio that is in a molar excess relative to the amount present of $(R^2)_3SiX$ so that the subscript criteria for the combination of the end stopping groups, $M_y$ and $M^{vi}_z$, s satisfied and then reacting this mixture with the orthosilicate ester of choice as previously described the mixed resins, $M_yM^{vi}_zQ$ may be conveniently prepared.

Silicone resins are not merely MQ resins, but MDQ, MTQ, and MDTQ resins as well (where D is the standard nomenclature for a divalent siloxyl structural unit and T is the standard nomenclature for a trivalent structural unit). Based on this disclosure, low molecular weight, high alkenyl content resins, primarily containing alkenyl end stopping groups as the major source of unsaturation in the resin, should be considered to be within the scope of the appended claims. Thus where $M'=M_yM^{vi}_z$, the following resins should be considered as equivalent in function to the M'Q resins specifically discussed: M'DQ, M'D$^{vi}$Q, M'DD$^{vi}$Q, M'TQ, M'T$^{vi}$Q, M'TTviQ, M'DTQ, MD$^{vi}$TQ, M'DD$^{vi}$TQ, M'DTT$^{vi}$Q, M'D$^{vi}$TT$^{vi}$Q, M'DD$^{vi}$TT$^{vi}$Q, M'T, MT$^{vi}$, M'TT$^{vi}$, M'DT, MD$^{vi}$T, M'DD$^{vi}$T, M'DTT$^{vi}$, M'D$^{vi}$TT$^{vi}$, and M'DD$^{vi}$TT$^{vi}$Q.

In their most general sense, the low molecular weight, high alkenyl content silicone resins of the present invention are represented by the formula:

or

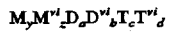

where M and $M^{vi}$ are as previously defined and described and

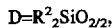

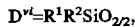

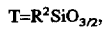

where in every case of each structural unit all the substituent variables, $R^1$ and $R^2$, are independently selected and are as previously defined and the subscripts a, b, c, d, and y are all independently zero or a positive number when Q is present and when Q is absent the subscripts c or d must be positive and non-zero. In view of the complexity of this general formula, the subscripts may be non-integral.

The present invention comprises the addition of high vinyl content MQ resins as herein before defined to low viscosity alkenyl organopolysiloxane compositions useful as LEVI formulations. Thus the LIM formulations of the present invention comprise:

(A) 100 parts by weight of an alkenyl, preferably vinyl containing polyorganosiloxane component comprising:
(1) 70 to 98 parts by weight of a linear high viscosity alkenyl or vinyl end-stopped organopolysiloxane having no more than 25 mole percent of phenyl radicals and having a viscosity of from about 2,000 to about 1,000,000 centipoise at 25° C.,
(2) 1 to 15 parts by weight of a linear low viscosity organopolysiloxane having at least one terminal alkenyl group per molecule, having an alkenyl or vinyl content that may vary from 0.01 mole percent alkenyl or vinyl to 60 mole percent alkenyl or vinyl, having a viscosity that varies from 50 to about 5,000 centipoise at 25° C. and having no more than 25 mole percent phenyl radicals, and,
(3) 1 to 15 parts by weight of an alkenyl or vinyl on chain organopolysiloxane having from about 0.1 to about 25 mole percent alkenyl or vinyl, having a viscosity that varies from about 50 to 100,000 centipoise at 25° C. and having no more than about 25 mole percent phenyl radicals;

(B) from about 5 to about 70 parts by weight of a filler;
(C) from about 0.1 to 50 parts per million of the total organopolysiloxane composition of a platinum catalyst;
(D) from about 0.1 to 10 parts by weight a SiH composition selected from the class consisting of hydrogen containing silanes and hydrogen containing organopolysiloxane;
(E) optionally, from about 0.1 to about 6.0 parts by weight a hydroxy containing organopolysiloxane fluid or resin having a viscosity ranging from about 5 to about 100 centipoise at 25° C.; and
(F) from about 0.001 to about 1.0 parts by weight per weight of the total liquid injection molding fluid of an injection molding inhibitor compound or compounds.

This composition may be either cured to an elastomer at room temperature for several hours or may be cured at elevated temperatures, such as, for example, 200° C. for 10 seconds. In one embodiment, the above composition is a two-component composition where the first component, contains at least all of ingredient (C), and the second component, contains all of ingredient (D) and the inhibitor compound(s) F.

The linear high viscosity alkenyl or vinyl end-stopped organopolysiloxane, A(1), has no more than 25 mole percent of phenyl radicals and a viscosity of from about 2,000 to about 1,000,000 centipoise 25° C., preferably from about 10,000 to about 500,000 at 25° C. These high viscosity organopolysiloxanes may be represented by the general formula:

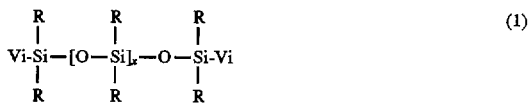
(1)

where Vi stands for alkenyl or vinyl, R is selected from the group consisting of monovalent hydrocarbon radicals and halogenated monovalent hydrocarbon radicals having up to about 20 carbon atoms, and x may vary from about 100 to about 10,000 or even higher, preferably ranging from about 500 to about 2,000. Suitable high viscosity organopolysiloxanes are disclosed in U.S. Pat. No. 3,884,866 hereby incorporated by reference.

The linear low viscosity organopolysiloxane, A(2), has at least one terminal alkenyl or vinyl group per molecule, an alkenyl or vinyl content that may vary from about 0.01 mole percent vinyl to about 60 mole percent vinyl, preferably from about 0.05 to about 10 mole percent alkenyl or vinyl, a viscosity that varies from about 50 to about 5,000 centipoise at 25° C., preferably from about 50 to 1,000 centipoise at 25° C.; and no more than about 25 mole percent phenyl radicals. These low viscosity organopolysiloxanes may be represented by the general formula:

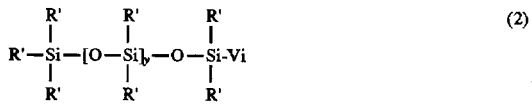
(2)

wherein R' is selected from the group consisting of monovalent hydrocarbon radicals having up to about 20 carbon atoms, halogenated monovalent hydrocarbon radicals having up to about 20 carbon atoms, and alkenyl or vinyl, Vi is alkenyl or vinyl, and y may vary from about 1 to about 750. Suitable low viscosity organopolysiloxanes are disclosed in U.S. Pat. No. 3,884,886 hereby incorporated by reference.

The alkenyl or vinyl on chain organopolysiloxanes, A(3), is important to obtaining the desired properties. Suitable alkenyl or vinyl on chain organopolysiloxanes have from about 0.1 to about 25 mole percent alkenyl or vinyl and preferably from about 0.2 to about 5 mole percent alkenyl or vinyl, a viscosity that varies from about 50 to about 100,000 centipoise at 25° C., preferably from about 100 to about 100,000 centipoise at 25° C., and no more than about 25 mole percent phenyl radicals. These organopolysiloxanes may be characterized as copolymers of (I) siloxane units having the formula:

$$R_a R_b^{2'} SiO_{(4-a-b/2)}$$ (3)

wherein R is selected from the group consisting of monovalent hydrocarbon radicals and halogenated monovalent hydrocarbon radicals having up to about 20 carbon atoms, $R^{2'}$ is an olefinic hydrocarbon radical attached to silicon by a C—Si linkage, and generally contains from 1 to about 20 aliphatic carbons, either straight chain or branched, and preferably from 1 to about 12 carbon atoms linked by multiple bonds, with the stoichiometric subscript a ranging from a value of 0 to about 2 inclusive, and the sum of the stoichiometric subscripts a and b ranges from about 0.8 to about 3.0 inclusive, and (II) organopolysiloxane units having the structural formula:

$$R_c SiO_{(4-c)/2}$$ (4)

wherein R is selected from the group consisting of monovalent hydrocarbon radicals and halogenated monovalent hydrocarbon radicals having up to about 20 carbon atoms, and the stoichiometric coefficient c ranges in value from about 0.85 to about 2.5, inclusive. $R^{2'}$ may be for example, allyl, methallyl, butenyl, pentenyl, hexenyl, heptenyl, octenyl, ethenyl, and the like, but is preferably vinyl. The copolymer of (I) and (II) generally contains from about 0.5 to 99.5 mole percent of the compound of formula (3) above and from about 0.5 to 99.5 mole percent of the compound of formula (4) above. The preparation of these copolymers is well known in the art, as is taught in U.S. Pat. Nos. 3,436,366 and 3,344,111 hereby incorporated by reference.

Preferred alkenyl or vinyl on chain organopolysiloxanes are linear and have the general formula:

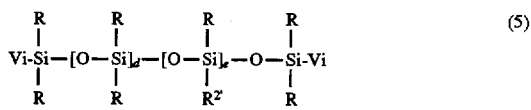
(5)

wherein R is selected from the group consisting of monovalent hydrocarbon radicals and halogenated monovalent hydrocarbon radicals having up to about 20 carbon atoms, $R^{2'}$ is an olefinic hydrocarbon radical attached to silicon by a C—Si linkage, and generally contains from 1 to about 20 aliphatic carbons, either straight chain or branched, and preferably from 1 to about 12 carbon atoms linked by multiple bonds, and d and e are positive integers such that the polymer contains up to approximately 20 mole percent $R^{2'}$. Vi is alkenyl or vinyl. Preferably $R^{2'}$ is vinyl but may also be alkenyl, then the polymer contains from 0.05 to 10 mole percent $R^{2'}$, and the viscosity ranges from about 300 to about 1000 at 25° C.

As previously recited, R is selected from the group consisting of monovalent hydrocarbon radicals and halogenated monovalent hydrocarbon radicals having up to about 20 carbon atoms, that is radicals normally associated as substituent groups for organopolysiloxanes. Thus the radical R may be selected from the class consisting of mononuclear and binuclear aryl radicals such as phenyl, tolyl, xylyl, benzyl, naphthyl, alkylnaphthyl and the like; halogenated mononuclear and binuclear aryl radicals such as chlorophenyl, chloronaphthyl and the like; mononuclear aryl lower alkyl radicals having from 0 to 8 carbon atoms per alkyl groups such as benzyl, phenyl and the like; lower alkyl radicals having from 1 to, 8 carbon atoms such as methyl, ethyl, propyl, butyl, pentyl, hexyl, heptyl, octyl and the like either as straight or branched chain alkyl substituents, lower alkenyl radicals having from 2 to 8 carbon atoms such as vinyl, allyl, and 1-propenyl; halo lower alkyl radicals having from 1 to 8 carbon atoms such as chloropropyl, trifluoropropyl, and cycloalkyl radicals such as cyclobutyl, cyclopentyl and cyclohexyl. Though R may be any of the above, persons skilled in the art will readily recognize that not every R can be a high molecular weight radical and that R should be chosen so as to not adversely affect the vinyl group reactions. Preferably R is a lower alkyl radical of 1 to 8 carbon atoms, such as methyl, ethyl, and phenyl trifluoropropyl. More particularly, R, is at least 70 percent by number methyl.

The SiH composition, (D), serves as a cross linking agent and may be selected from the class consisting of hydrogen containing silanes and hydrogen containing organopolysiloxanes. Hydrogen containing organopolysiloxane can be characterized as copolymers containing at least one unit per molecule having the formula:

 (6)

where the remaining siloxane units in the organopolysiloxane are within the scope of formula (4) above, with the notable exception that the R of formula (4) as well as the R herein should be saturated, f has a value ranging from 0 to about 2, inclusive; and the sum of f and g ranges from about 0.8 to about 3.0. The viscosity of the hydrogen containing organopolysiloxane should range from about 5 to about 100 centipoise at 25° C.

Included with the hydrogen containing organopolysiloxane described above are MQ resins having units of, for example, $M(R)_2$, $SiO_{1/2}$ and $SiO_2$. Also included therein are MDQ, MTQ, MDT, MTQ, and MDTQ resins with hydrogen substitution. Thus copolymer generally contains from 0.5 to 99.5 mole percent of the units of formula (6) and from 99.5 mole percent of the units of formula (4).

The compounds, oligomers, resins or fluids designated MQ, MDQ, MTQ, MDT, MDTQ, and MT refer to the nomenclature explained in the research monograph by H. A. Liebhafsky, "Silicones Under the Monogram," published by Wiley-Interscience division of John Wiley and Sons, New York (publication date 1978) at pages 99 and following. In the context of the present invention, substitutional isomerization such as M' being different from M but functioning as an "M" in terms of polymer building blocks as well as D' and D, T' and T, and Q' and Q, likewise; there being many varieties of each type of building block, are all encompassed by the simple shorthand notation referred to in the reference and herewith assume the same variability with respect to composition while retaining their respective M, D, T, and Q functionality.

A preferred hydrogen containing organopolysiloxane is a linear organopolysiloxane of the formula:

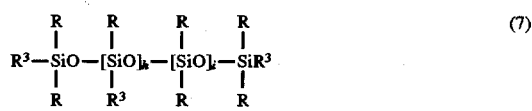 (7)

wherein R is defined as above, excluding unsaturated compounds, $R^3$ is the same as R excluding unsaturated compounds and with the addition of hydrogen, h varies from 1 to about 1000, and i varies from 5 to about 200. More preferably, h varies from 10 to about 500 and i varies from 5 to about 200.

The hydrogen containing organopolysiloxane, (D), is utilized at a concentration of anywhere from about 0.5 to 25 part by weight per 100 parts by weight (A), and preferably at a concentration of from about 0.5 to about 10 parts by weight per 100 parts by weight (A). It is desirable that in the SiH material there is at least one hydrogen atom for every vinyl group in (A) and preferably from about 1.1 to about 2.5 hydrogen atoms for every vinyl group.

Many types of platinum catalysts for this SiH olefin addition reaction are known and such platinum catalysts may be used for the reaction in the present instance. When optical clarity is required the preferred platinum catalysts are those platinum compound catalysts that are soluble in the reaction mixture. The platinum compound can be selected from those having the formula $(PtCl_2Olefin)$ and $H(PtCl_3Olefin)$ as described in U.S. Pat. No. 3,159,601, hereby incorporated by reference. The olefin shown in the previous two formulas can be almost any type of olefin but is preferably an alkenylene having from 2 to 8 carbon atoms, a cycloalkenylene have from 5 to 7 carbon atoms or styrene. Specific olefins utilizable in the above formulas are ethylene, propylene, the various isomers of butylene, octylene, cyclopentene, cyclohexene, cycloheptene, and the like.

A further platinum containing material usable in the compositions of the present invention is the cyclopropane complex of platinum chloride described in U.S. Pat. No. 3,159,662 hereby incorporated by reference.

Further the platinum containing material can be a complex formed from chloroplatininc acid with up to 2 moles per gram of platinum of a member selected from the class consisting of alcohols, ethers, aldehydes and mixtures of the above as described in U.S. Pat. No. 3,220,972 hereby incorporated by reference.

The catalyst preferred for use with liquid injection molding compositions are described in U.S. Pat. Nos. 3,715,334; 3,775,452; and 3,814,730 to Karstedt. Additional background concerning the art may be found at J. L. Spier, "Homogeneous Catalysis of Hydrosilation by Transition Metals", in Advances in Organometallic Chemistry, volume 17, pages 407 through 447, F. G. A. Stone and R. West editors, published by the Academic Press (New York, 1979). Persons skilled in the art can easily determine an effective amount of platinum catalyst. Generally, an effective amount ranges from about 0.1 to 50 parts per million of the total organopolysiloxane composition.

In order to obtain high tensile strength in the compositions of the present invention, it is desirable to incorporate a filler, (B), into the composition. Examples of the many fillers that may be chosen are titanium dioxide, lithopone, zinc oxide, zirconium silicate, silica aerogel, iron oxide, diatomaceous earth, calcium carbonate, fumed silica, silazane treated silica, precipitated silica, glass fibers, magnesium oxide, chromic oxide, zirconium oxide, aluminum oxide, alpha quartz, calcined clay, asbestos, carbon, graphite, cork, cotton, synthetic fibers, and the like.

The preferred fillers that should be utilized in the composition of the present invention are either a fumed silica or a precipitated silica that has been surface treated. In one method of surface treatment, the fumed silica or precipitated silica is exposed to cyclic organopolysiloxanes under heat and pressure. An additional method of treating fillers is one in which the silica is exposed to siloxanes or silanes in the presence of an amine compound.

A particularly preferred method of surface treating silica fillers employs methyl silane silazane surface treating agents. Methylsilane or silazane surface treated fumed or precipitated silica fillers exhibit the property of flowing easily and also do not increase the low viscosity of the uncured liquid precursor silicone composition. After curing, silazane treated silicas impart an improved tear strength to the cured elastomer. Combining the silazane treatment with composition (A) for in situ treating seems to give the greatest improvement in physical properties. Silazanes treatments are disclosed in U.S. Pat. Nos. 3,635,743 and 3,847, 848 hereby incorporated by reference.

The filler, (B), is generally utilized in a concentration of from about 5 to about 70 parts, preferably 15 to 50 parts filler for each 100 parts by weight of (A). The preferred filler is silazane treated fumed silica or mixtures of silazane treated fumed silica with silazane treated precipitated silica. This latter mixture is particularly preferred containing a weight ratio of fumed silica to precipitated silica of about 25/1 to about 1/1 and preferably from about 10/1 to about 5/1.

Hydroxy containing organopolysiloxane fluid or resin, (E), may be added to improve the mold release properties and to extend the shelf life of the liquid injection molding organopolysiloxane composition. Where silazane treated precipitated silica filler is present in the composition, the hydroxy containing organopolysiloxane fluid or resin may be added in conjunction with the precipitated silica filler to obtain extended shelf life and mold release. Suitable hydroxy containing organopolysiloxane fluids have a viscosity of from about 5 to about 100 centipoise at 25° C. and preferably from about 20 to 50 centipoise. These fluids may be represented by the formula:

$$R_j(OH)_k SiO_{(4-j-k)/2} \tag{8}$$

where R is defined as above, j may range from 0 to about 3, preferably 0.5 to about 2.0, k ranges from 0.005 to about 2, and the sum of j and k ranges from about 0.8 to about 3.0. The hydroxy substitution on the organopolysiloxane fluid or resin is primarily a terminal hydroxy substitution.

To obtain mold release properties employing a combination of silazane treated silica and composition (E), or to obtain extended shelf-life upon the addition of (E) alone, there should be present in composition (B) at least about 2 parts by weight silazane treated silica for each 100 parts by weight of (A) and there should be present as composition (E) from about 1 to about 5 parts by weight for each 100 parts by weight (A).

The ingredients present in composition (C), component I, may be packaged separately from the ingredients present in composition (D), component II, until the time of cure. Compositions (A), (B), (E), and additives may be divided between either component or wholly added to one component. Premature reactions are avoided in this manner during storage and transport. When it is desired to form the cured silicone rubber composition, the two components are mixed into each other and the composition is allowed to cure. A fairly general practice is to formulate inhibitors such that the cure rates will allow storage of the resin within a liquid injection molding apparatus over short periods of time such as a weekend without the curable composition curing during storage.

Traditionally liquid injection molding systems have two components, a first component that contains a platinum containing catalyst, and a second component that contains a hydride and an inhibitor. The two components are mixed in a static mixer just prior to use in injection molding. Injection molding cavity temperatures are typically 300° F. or more. The primary function of the liquid injection molding inhibitor is to prevent curing of the molding composition until the mold is filled and thereafter, the mold being filled, to allow a rapid cure to ensure short cycle times. The two components may be injected molded directly or dissolved in solvents for application as a film or coating.

In injection molding, the mixing barrel and shot chamber must be cool in order to prevent premature cure. The mold temperature generally varies from about 150° F. to about 500° F. Pigments, thixotropic agents, thermal stabilizers, and the like may be added according to the teachings in the art. It is particularly desirable to add inhibitors in order to obtain a reasonable work life in the catalyzed material. Suitable inhibitors are taught in U.S. Pat. No. 4,256,870 hereby incorporated by reference. One of the most significant problems present in the existing art is the limitation on article size and weight imposed by the kinetics of the catalyzation and the thermochemistry of the injection molding process. These two parameters presently interact to limit the size of liquid injection molded silicone rubber articles of manufacture.

U.S. Pat. No. 3,445,420, the teachings of which are hereby incorporated by reference, discloses and claims curable compositions comprising organopolysiloxanes and acetylenic compounds having a boiling point of at least 25° C. where the acetylenic compound has at least one acetylenic moiety contained within the structural framework of the molecule. Although the use of the acetylenic compounds disclosed and claimed in the '420 patent is well-known in the art, practice of the invention represented by the '420 patent and related inventions has not enabled the liquid injection molding of larger molded articles as contrasted with the present invention.

The LIM compositions utilized by the present invention are thus:

1) from 35 to 75 parts by weight of a vinyl stopped polydimethylsiloxane, A(1), having a viscosity ranging anywhere from 10,000 to 100,000 centipoise and a vinyl content ranging approximately from 0.05 to 0.15 weight percent;

2) up to 10 parts by weight of a low molecular weight vinyl stopped vinyl on chain polyorganosiloxane, A(3), having a viscosity ranging from 50 to 5,000 centipoise and a vinyl content of approximately 1.5 weight percent;

3) up to 10 parts by weight of a mono-vinyl stopped polyorganosiloxane, A(2), having a viscosity ranging anywhere from 50 to 100,000 centipoise;

4) from 5 to 30 parts by weight of a fumed or pyrogenic silica filler (B), having a surface area ranging from 150 to 450 m$^2$/gm;

5) from 2 to 50 wppm of a Pt hydrosilylation catalyst, (C);

6) from 0.01 to 0.50 parts by weight of an inhibitor compound, (F); and 7) from 100 to 500 wppm of silyl hydrides, (D);

8) from 0.1 to 10 parts by weight of a low molecular weight, high alkenyl content MQ resin, $M_y M^{vi}_z D_a D^{vi}_b T_c T^{vi}_d Q$ or $M_y M^{vi}_z D_a D^{vi}_b T_c T^{vi}_d$, as herein before defined along with 9) an additional amount, if necessary, of a silyl hydride whereby the hydrido groups are present at least in molar equivalence to the total quantity of olefinic unsaturation present; and 10) from 0.1 to 6.0 parts by weight of a mold release agent, typically a silanol fluid being a hydroxy stopped polydiorganosiloxane having a silanol content of from about 2 weight percent to about 11 weight percent silanol and a viscosity of about 5 to about 100 centipoise or a silanol containing resin having a silanol content of from about 1 weight percent to about 5 weight percent silanol and a viscosity of about 1,000 to about 12,000 centipoise.

While the addition of the high alkenyl content resins of the present invention to a LIM formulation will improve certain physical properties such as Durometer, given a standard quantity of a LIM base formulation, the addition of progressively larger quantities of the high alkenyl resin, or mixtures thereof, will progressively improve those properties. Accompanying this increase in high alkenyl content resin added to the LIM formulation to achieve this controllable improvement in physical properties, there should also be a proportional increase in the amount of hydride containing materials added to the LIM formulation, in order to maintain the desired 1 to 1.6 molar ratio of silyl hydride species to alkenyl species. While an examination of chemical stoichiometry would indicate that a one to one molar basis between the alkenyl group and the hydride groups would establish the necessary one to one equivalence for cross linking, because of diffusion limitations and the fact that a cross linking reaction is occurring which further decreases diffusion, a molar excess of hydride to alkenyl will tend to improve the physical properties of a given formulation relative to those formulations where the two reactants are present in strict molar equivalence. This molar excess ranges from about 20 to 40%, preferably from 25 to 35%, and most preferably a 30% molar excess of hydride over alkenyl in the LIM composition.

All of the U.S. patents referenced herein are herewith specifically incorporated by reference.

EXPERIMENTAL

Preparation of Low Molecular Weight, High Alkenyl Content MQ Resins having the Formula:
$M_y M^{vi}_z D_a D^{vi}_b T_c T^{vi}_d Q$ The following preparative procedure while specific for $M^{vi}_x Q$ with x=3 is generalizable to x=2 and x=4 by varying the molar proportion of $R^1(R^2)_2 SiX$ to the orthosilicate ester.

To a solvent mixture of water and xylene, containing 898 g of water and 612 g of xylene (other aromatic solvents which may be used include but are not limited to toluene, benzene, mesitylene, chlorobenzenes, nitrobenzenes and the like), placed in a 5 liter multi-necked round bottom flask, fitted with an overhead stirrer, thermometer, and an addition funnel, there was added 1,333 g of vinyldimethylchlorosilane ($R^1(R^2)_2 SiX$, X=Cl, $R^1$=CH$_2$=CH—, and $R^2$=CH$_3$) and 767 g of tetraethyl-orthosilicate ($R^3$=C$_2$H$_5$) with vigorous agitation. An exotherm occurred raising the temperature of the reaction mixture to 80° C., where reflux occurred. Reflux was continued for two hours, whereupon the reaction mixture was cooled to 25° C. The organic layer, weighing 1,815 g was stripped at 140° C. 1.71 g of potassium hydroxide was added and the water was removed by azeotropic distillation over a period of four hours at 140° C. The purified organic layer was then cooled to room temperature. High boiling reaction by-products were removed by vacuum distillation at 165° C. at 10 mm Hg. Upon cooling the product was filtered over Celite 454®, manufactured by Johns-Manville Corp. Table 1 summarizes the preparation of three exemplary resins of the present invention.

TABLE 1

Reagent Quantities for MQ Resins of the Formula

| $(R^1(R^2)_2 Si)_x(SiO_{4/2})$: Quantity of $R^1(R^2)_2 SiX$ $R^1$ = CH$_2$=CH—, $R^2$ = —CH$_3$, X = Cl | Quantity of Ester Si(OR$_3$)$_4$ $R^3$ = C$_2$H$_5$ | Molar Ratio M/Q |
|---|---|---|
| 1,127 g | 973 g | 2 |
| 1,333 g | 767 g | 3 |
| 1,495 g | 645 g | 4 |

Preparation of $M_{0.01} M^{vi}_{2.99} Q$

This resin was prepared by substituting a mixture of 1,319.7 g of vinyldimethylchlorosilane and 13.3 g of trimethylchlorosilane for 1,333 g of vinyldimethylchlorosilane in the foregoing preparative procedure.

Preparation of $M_y M^{vi}_z D_a D^{vi}_b T_c T^{vi}_d Q$ Compounds

All of the resins of the present invention, selected from the group of resins consisting of:

$M_y M^{vi}_z D_a D^{vi}_b T_c T^{vi}_d Q$ and $M_y M^{vi}_z D_a D^{vi}_b T_c T^{vi}_d$ may be easily prepared by varying the choice of the initial reagents and the molar proportions of the variously functional structural components as described in the following examples.

Preparation of $M_{0.01} M_{vi2.98} T_{0.01} Q$

This resin may be prepared by substituting a mixture of 1,304.6 g of vinyldimethylchlorosilane, 13.3 g of trimethylchlorosilane and 13.3 g of methyltrichlorosilane in the preparative procedure previously described.

Preparation of $M_{0.01} M^{vi}_{2.97} T_{0.01} T^{vi}_{0.01} Q$

This resin may be prepared by substituting a mixture of 1,293.1 g of vinyldimethylchlorosilane, 13.3 g of trimethylchlorosilane, 13.3 g of vinyltrichlorosilane and 13.3 g of methyltrichlorosilane in the preparative procedure previously described.

Preparation of $M_{0.01} M^{vi}_{2.97} D_{0.01} T^{vi}_{0.01} Q$

This resin may be prepared by substituting a mixture of 1,293.1 g of vinyldimethylchlorosilane, 13.3 g of trimethylchlorosilane, 13.3 g of dimethylchlorosilane and 13.3 g of vinyltrichlorosilane in the preparative procedure previously described.

Thus by varying the proportions of the various starting reagents generally defined as follows all of the exemplary resins of the present invention may be prepared:

M=(triorgano)Si, general starting reactant of choice is (triorgano)silyl halide;

$M^{vi}$=(diorgano)(alkenyl)Si, general staring reactant of choice is (diorgano)(alkenyl)silyl halide;

D=(diorgano)SiO$_{2/2}$, general starting reactant of choice is (diorgano)silyl di-halide;

$D^{vi}$=(organo)(alkenyl)SiO$_{2/2}$, general starting reactant of choice is (organo)(alkenyl)silyl di-halide;

T=(organo)SiO$_{3/2}$, general starting reactant of choice is (organo)silyl tri-halide;

$T^{vi}$=(alkenyl)SiO$_{3/2}$, general starting reactant of choice is (alkenyl)silyl tri-halide; and Q may be a tetra-organo orthosilicate, sodium silicate, or other silicate compounds that would be expected to react the same under the conditions of synthesis by a person having ordinary skill in the art and science of synthetic, preparative chemistry.

Preparation of Liquid Injection Molding Composition with Alkenyl MQ Resins

Preparation of Control: Vinyl LIM

A mixture of a standard vinyl liquid injection molding composition was prepared as follows:

1) 4,921 g of a vinyl stopped polydimethylsiloxane, (A(1)), having a viscosity of 40,000 centipoise and a vinyl content of approximately 0.08 weight percent;

2) 227 g of a low molecular weight vinyl stopped vinyl on chain polyorganosiloxane, (A(3)), having a viscosity of 500 centipoise and a vinyl content of approximately 1.60 weight percent;

3) 227 g a low molecular weight mono-vinyl stopped polyorganosiloxane, (A(2)), having a viscosity of 500 centipoise having a vinyl content of approximately 0.195 weight percent;

4) 75.7 g of a 7% silanol content linear polydimethylsiloxane silanol fluid, (E), having a viscosity of 100 centipoise;

5) 75.7 g of an MQ silanol resin, (E), having about 1% silanol groups where the M group is a trimethylsilyl group having a viscosity of approximately 4,500 centipoise;

6) 1,893 g of a fumed silica, (B) having a surface area of 325 m$^2$/gm;

7) The Pt hydrosilylation catalyst, (C), ranging in amount, based on the total composition, from about 4 wppm to about 15 wppm, was added subsequent in making the blends to test the invention;

8) The 1-ethynyl-1-cyclohexanol as a cure inhibitor, (F), ranging in amount, based on the total weight of the composition from about 0.05 to about 0.15 weight percent was added subsequent in making the blends to test the invention;

9) The mixture of silyly hydrides, (D) consisting of a 3:1 weight mixture of M$^H{}_2$Q having a hydride content of 0.99 weight percent and MD$^H$DM having a hydride content of 0.79 weight percent, where the mixture had a hydride content of 0.94 weight percent, was added subsequent in making the blends of the invention and it should be noted that M$^H$=H(CH$_3$)$_2$Si, D$^H$=H(CH$_3$)SiO$_{2/2}$, and D=(CH$_3$)$_2$SiO$_{2/2}$. The hydride content of the hydride resins may vary, it is only essential that whatever the hydride content of the resin, a sufficient quantity is added to the curable formulation so that an acceptable cross link density results upon curing.

Components 1) through 6) are mixed together and split into two approximately equal fractions "A" and "B" in which component 7) is added to the "A" fraction and components 8) and 9) are added to fraction "B."

EXAMPLES 1–3

The base mixture (control vinyl LIM) and various amounts of M$^{vi}{}_2$Q were blended in a 1 pint Baker-Perkins mixer for 30 minutes under a nominal 20 mm Hg vacuum followed by a pressurized heat cure in 6"×6"×0.70" compression mold for 17 minutes at 350 ° F. The compositions are tabulated in Table 2 and evaluations of the resulting heat cured materials are tabulated in Table 3–7.

TABLE 2

High Alkenyl MQ LIM Compositions:

|  | Wt. of A + B | Wt of M$^{vi}{}_2$Q | Wt. of Hydride Mixture |
|---|---|---|---|
| Composition 1 | 198 g | 2 g | 3.68 g |
| Composition 2 | 196 g | 4 g | 4.76 g |
| Composition 3 (control) | 200 g | 0 g | 2.60 g |

TABLE 3a

Evaluation of High Alkenyl LIM Compositions as Cured

| Comp'n | Durometer | Tensile psi | Elong'n % | Tear B ppi | 100% modulus |
|---|---|---|---|---|---|
| 1 | 60 | 1150 | 400 | 250 | 380 psi |
| 2 | 69 | 1175 | 400 | 250 | 440 psi |
| 3 | 51 | 1200 | 525 | 240 | 220 psi |

TABLE 3b

Evaluation of High Alkenyl LIM Compositions as Cured

| Comp'n | T90 sec. at 350° F. | Compression Set, 22 hrs at 350° F. | % Volume swell in Fuel C | Bayshore Resilience |
|---|---|---|---|---|
| 1 | 21 | 34 | 267 | 65 |
| 2 | 22 | 38 | 249 | 65 |
| 3 | 17 | 30 | 291 | 65 |

TABLE 4

Results of the Addition of M$_{0.01}$M$^{vi}{}_{2.99}$Q to LIM Compositions:
M = trimethylsilyl; M$^{vi}$ = vinyldimethylsilyl

| Example | 4 | 5 | 6 | 7 |
|---|---|---|---|---|
| Weight of LIM (A + B) formulation, g (control vinyl LIM) | 200 | 200 | 200 | 200 |
| Weight of M$_{0.01}$M$^{vi}{}_{2.99}$Q added, g | 2 | 5.3 | 5.0 | 5.3 |
| Weight of total hydride, g | 4.4 | 7.22 | 7.20 | 7.48 |
| Shore A (Durometer) | 64.5 | 71 | 68 | 69 |
| Tensile, psi | 1002 | 1038 | 1165 | 1145 |
| Elongation | 348 | 370 | 395 | 397 |
| Tear B, ppi | 236 | 235 | 212 | 2117 |
| 100% Modulus | 362 | 430 | 434 | 4431 |
| Bayshore | na | na | 64 | 65 |
| Compression Set 22 hrs at 350° F. | 31.90 | 43.00 | 27.80 | 16.20 |

The above data indicates that by increasing the fraction of additional high alkenyl content resin, M$_y$M$^{vi}{}_z$D$_a$D$^{vi}{}_b$T$_c$T$^{vi}{}_d$Q or M$_y$M$^{vi}{}_z$D$_a$D$^{vi}{}_b$T$_c$T$^{vi}{}_d$, along with the required amount of additional hydride that an increased improvement in physical properties results. Depending on the magnitude of the property the amount of added resin may be increased or decreased.

TABLE 5

Results of the Addition of M$^{vi}{}_3$Q (~2%) to LIM Compositions Varying Quantity of Additional Hydride:
M$^{vi}$ = vinyldimethylsilyl

| Example | 8 | 9 | 10 | 11 |
|---|---|---|---|---|
| Weight of LIM (A + B) formulation, g (control vinyl LIM) | 200 | 200 | 200 | 200 |
| Weight of M$^{vi}{}_3$Q added, g | 5 | 5 | 5 | 5 |
| Weight of total hydride, g | 6.62 | 7.48 | 9.2 | 10.65 |
| SiH/SiVi ratio | 1.15 | 1.3 | 1.6 | 1.85 |
| Shore A (Durometer) | 69 | 71 | 74 | 73 |
| Tensile, psi | 1041 | 1274 | 1135 | 1123 |
| Elongation, % | 340 | 352 | 301 | 300 |
| Tear B, ppi | 237 | 230 | 126 | 83 |
| 100% Modulus | 454 | 531 | 530 | 510 |
| Bayshore | 65 | 66 | 64 | 65 |
| Compression Set 22 hrs at 350° F. | 48.70 | 21.90 | 56.50 | 67.4 |

TABLE 6

Results of the Addition of M$^{vi}_3$Q (~1%) to LIM Compositions Varying Quantity of Additional Hydride: M$^{vi}$ = vinyldimethylsilyl

| Example | 12 | 13 | 14 | 15 | 16 | 17 |
|---|---|---|---|---|---|---|
| Weight of LIM (A + B) formulation, g | 200 | 200 | 200 | 200 | 200 | 200 |
| Weight of M$^{vi}_3$Q added, g | 2 | 2 | 2 | 2 | 2 | 2 |
| Weight of total hydride, g | 3.5 | 3.9 | 4.07 | 4.6 | 5.66 | 6.37 |
| SiH/SiVi ratio | 1 | 1.1 | 1.15 | 1.3 | 1.6 | 1.8 |
| Shore A (Durometer) | 52 | 52 | 58 | 58 | 60 | 60 |
| Tensile, psi | 1356 | 1415 | 1481 | 1374 | 1381 | 1411 |
| Elongation, % | 520 | 543 | 478 | 432 | 392 | 385 |
| Tear B, ppi | 236 | 252 | 240 | 230 | 194 | 143 |
| 100% Modulus | 346 | 341 | 381 | 388 | 400 | 407 |
| Bayshore | 61 | 63 | 63 | 64 | 67 | 64 |
| Compression Set 22 hrs at 350° F. | na | na | 56.90 | 42.40 | 62.30 | 82.10 |

Tables 5 and 6 demonstrate an optimum hydride to alkenyl ratio of approximately 1.3 to 1 or a 30 mole % excess. Further comparison of the results between Tables 5 and 6 also supports the conclusions drawn from Table 4, that increasing the level of the alkenyl resin, $M_yM^{vi}_zD_aD^{vi}_bT_cT^{vi}_dQ$, improves physical properties.

TABLE 7

Results Obtained with M$^{vi}_3$Q and M$^{vi}_4$Q:

| Example | 18 | 19 | 20 |
|---|---|---|---|
| Weight of LIM (A + B) formulation, g | 200 | 200 | 200 |
| Weight of M$^{vi}_3$Q added, g | 2 | 4 | 0 |
| Weight of M$^{vi}_4$Q added, g | 0 | 0 | 4 |
| Weight of total hydride, g | 4.5 | 6.4 | 6.3 |
| SiH/SiVi ratio | 1.3 | 1.3 | 1.3 |
| Shore A (Durometer) | 59 | 63.5 | 62 |
| Tensile, psi | 1153 | 1100 | 1190 |
| Elongation, % | 381 | 352 | 386 |
| Tear B, ppi | 220 | 206 | 213 |
| 100% Modulus | 387 | 442 | 467 |
| Bayshore | 62 | 69 | 65 |
| Compression Set 22 hrs at 350° F. | 31.50 | 25.00 | 33.00 |

The test methods used to evaluate the cured compositions utilizing the resins and liquid injection molding compositions of the present invention are as follows: Shore A—ASTM D2240-86; Tensile/Elongation/100% Modulus—ASTM D412-87; and Tear B—ASTM 2240-86.

Having described the invention, that which is claimed is:

1. A silicone resin selected from the group consisting of silicone resins having the formula:

$M_yM^{vi}_zD_aD^{vi}_bT_cT^{vi}_dQ$ and $M_yM^{vi}_zD_aD^{vi}_bT_cT^{vi}_d$;

where
Q=SiO$_{4/2}$;
M=(R$^2$)$_3$SiO$_{1/2}$;
M$^{vi}$=R$^1$(R$^2$)$_2$SiO$_{1/2}$;
D=R$^2_2$SiO$_{2/2}$;
D$^{vi}$=R$^1$R$^2$SiO$_{2/2}$;
T=R$^2$SiO$_{3/2}$; and
T$^{vi}$=R$^1$SiO$_{3/2}$;

where each R$^1$ is independently selected and is a two to twelve carbon atom alkenyl group and where each R$^2$ is independently selected and is a one to eight carbon atom alkyl, aryl, or alkylaryl group and where the subscripts a, b, c, d, and y may be zero or a positive number when Q is present and when Q is absent one of the subscripts c or d must be positive and non-zero and where the subscripts y and z satisfy the following relationship:

$2 \leq (y+z) \leq 4$ subject to the limitation that z and y satisfy one of the two relationships:

$(z/y) > 1$ or $z > y$.

2. The resin of claim 1 where all of the sub-scripts are greater than zero.
3. The resin of claim 1 where the subscript d is zero.
4. The resin of claim 1 where the subscript c is zero.
5. The resin of claim 1 where the subscripts d and c are zero.
6. The resin of claim 5 where the subscript b is zero.
7. The resin of claim 5 where the subscript a is zero.
8. The resin of claim 5 where the subscripts a and b are zero.
9. The resin of claim 1 where the subscript a is zero.
10. The resin of claim 1 where the subscript b is zero.
11. The resin of claim 1 where the subscripts a and b are zero.
12. The resin of claim 11 where the subscript c is zero.
13. The resin of claim 11 where the subscript d is zero.
14. The resin of claim 8 where the subscript y is zero.
15. The resin of claim 8 where R$^1$ is vinyl and R$^2$ is methyl.
16. The resin of claim 8 where R$^1$ is vinyl and R$^2$ is methyl.
17. A silicone liquid injection molding composition comprising the resin of claim 1.
18. A silicone liquid injection molding composition comprising the resin of claim 15.
19. A silicone liquid injection molding composition comprising the resin of claim 16.
20. A liquid injection molded article of manufacture comprising the resin of claim 1.
21. A liquid injection molded article of manufacture comprising the resin of claim 15.
22. A liquid injection molded article of manufacture comprising the resin of claim 16.
23. The liquid injection molding composition of claim 17 where the molar ratio of hydride to alkenyl is defined by a molar excess of about 30 percent for the quantity of hydride present relative to the quantity of alkenyl present in the composition.
24. A process for controlling the cured properties of a curable silicone liquid injection molding composition which comprises the resin of claim 1 comprising varying the amount of said resin present in said composition and curing said composition.
25. A silicone resin selected from the group consisting of silicone resins having the formula:

$M_yM^{vi}_zD_aD^{vi}_bT_cT^{vi}_dQ$ and $M_yM^{vi}_zD_aD^{vi}_bT_cT^{vi}_d$;

where
Q=SiO$_{4/2}$;

$M = (R^2)_3 SiO_{1/2}$;
$M^{vi} = R^1(R^2)_2 SiO_{1/2}$;
$D = R^2_2 SiO_{2/2}$;
$D^{vi} = R^1 R^2 SiO_{2/2}$;
$T = R^2 SiO_{3/2}$; and
$T^{vi} = R^1 SiO_{3/2}$;
where each $R^1$ is independently selected and is a two to twelve carbon atom alkenyl group and where each $R^2$ is independently selected and is a one to eight carbon atom alkyl, aryl, or alkylaryl group and where the subscripts a, b, c, d, and y may be zero or a positive number when Q is present and when Q is absent one of the subscripts c or d must be positive and non-zero and where the subscripts y and z satisfy the following relationship:

$$2 \leq (y+z) \leq 4$$

subject to the limitation that z and y satisfy one of the two relationships:

$$(z/y) > 1 \text{ or } z > y;$$

whereby said resin has a molecular weight below about 2,000 g/mole, an alkenyl content of up to about 30 weight percent, and a viscosity of up to about 15,000 centipoise at 25° C.

26. A mixture of silicone resins comprising the resin of claim 25.

27. A silicone resin selected from the group of silicone resins having the formula:

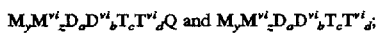

where
$Q = SiO_{4/2}$;
$M = (R^2)_3 SiO_{1/2}$;
$M^{vi} = R^1(R^2)_2 SiO_{1/2}$;
$D = R^2_2 SiO_{2/2}$;
$D^{vi} = R^1 R^2 SiO_{2/2}$;
$T = R^2 SiO_{3/2}$; and
$T^{vi} = R^1 SiO_{3/2}$;
where each $R^1$ is independently selected and is a two to twelve carbon atom alkenyl group and where each $R^2$ is independently selected and is a one to eight carbon atom alkyl, aryl, or alkylaryl group and where the subscripts a, b, c, d and y may be zero or a positive number, one of the subscripts c or d must be positive and non-zero, and the subscripts y and z satisfy the following relationship:

$$1 \leq (y+z) \leq 4$$

subject to the limitation that z and y satisfy one of the two relationships:

$$(z/y) > 1 \text{ or } z > y.$$

28. The resin of claim 27 whereby y and z satisfy the relationship $2 \leq (y+z) \leq 4$.

29. The resin of claim 28 where all of the sub-scripts are greater than zero.

30. The resin of claim 27 where the subscript d is zero.
31. The resin of claim 27 where the subscript c is zero.
32. The resin of claim 27 where the subscripts c and d are positive and non-zero.
33. The resin of claim 32 where the subscript b is zero.
34. The resin of claim 32 where the subscript a is zero.
35. The resin of claim 32 where the subscripts a and b are zero.

36. The resin of claim 27 where the subscript a is zero.
37. The resin of claim 27 wherein the subscript b is zero.
38. The resin of claim 27 where the subscripts a and b are zero.
39. The resin of claim 38 where the subscript c is zero.
40. The resin of claim 38 where the subscript d is zero.
41. The resin of claim 35 where the subscript y is zero.
42. The resin of claim 35 where $R^1$ is vinyl and $R^2$ is methyl.
43. The resin of claim 35 where $R^1$ is vinyl and $R^2$ is methyl.
44. A silicone liquid injection molding composition comprising the resin of claim 29.
45. A silicone liquid injection molding composition comprising the resin of claim 42.
46. A silicone liquid injection molding resin composition comprising the resin of claim 43.
47. A liquid injection molded article of manufacture comprising the resin of claim 27.
48. A liquid injection molded article of manufacture comprising the resin of claim 42.
49. A liquid injection molded article of manufacture comprising the resin of claim 43.
50. The liquid injection molding composition of claim 44 where the molar ratio of hydride to alkenyl is defined by a molar excess of about 30 percent for the quantity of hydride present relative to the quantity of alkenyl present in the composition.
51. A process for controlling the cured properties of a curable silicone liquid injection molding composition which comprises the resin of claim 27 comprising varying the amount of said resin present in said composition and curing said composition.
52. A silicone resin selected from the group consisting of silicone resins having the formula:

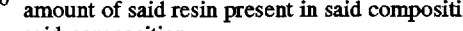

where
$Q = SiO_{4/2}$;
$M = (R^2)_3 SiO_{1/2}$;
$M^{vi} = R^1(R^2)_2 SiO_{1/2}$;
$D = R^2_2 SiO_{2/2}$;
$D^{vi} = R^1 R^2 SiO_{2/2}$;
$T = R^2 SiO_{3/2}$; and
$T^{vi} = R^1 SiO_{3/2}$;
where each $R^1$ is independently selected and is a two to twelve carbon atom alkenyl group and where each $R^2$ is independently selected and is a one to eight carbon atom alkyl, aryl, or alkylaryl group and where the subscripts a, b, c, d and y may be zero or a positive number, one of the subscripts c or d must be positive and non-zero, and the subscripts y and z satisfy the following relationship:

$$1 \leq (y+z) \leq 4$$

subject to the limitation that z and y satisfy one of the two relationships:

$$(z/y) > 1 \text{ or } z > y;$$

whereby said resin has a molecular weight below about 2,000 g/mole, an alkenyl content of up to about 30 weight percent, and a viscosity of up to about 15,000 centipoise at 25° C.

53. A mixture of silicone resins comprising the resin of claim 52.

* * * * *